(12) United States Patent
Ishii et al.

(10) Patent No.: US 7,974,231 B2
(45) Date of Patent: Jul. 5, 2011

(54) COMMUNICATION CONTROL APPARATUS AND COMMUNICATION CONTROL METHOD

(75) Inventors: Hiroyuki Ishii, Yokosuka (JP); Anil Umesh, Yokohama (JP); Masafumi Usuda, Tokyo (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 734 days.

(21) Appl. No.: 11/912,818

(22) PCT Filed: Apr. 25, 2006

(86) PCT No.: PCT/JP2006/308627
§ 371 (c)(1),
(2), (4) Date: May 1, 2008

(87) PCT Pub. No.: WO2006/118102
PCT Pub. Date: Nov. 9, 2006

(65) Prior Publication Data
US 2009/0073927 A1  Mar. 19, 2009

(30) Foreign Application Priority Data

Apr. 27, 2005 (JP) ................. 2005-130292

(51) Int. Cl.
*H04B 7/185* (2006.01)
*H04M 5/00* (2006.01)
(52) U.S. Cl. ....................... 370/318; 455/574
(58) Field of Classification Search .............. None
See application file for complete search history.

(56) References Cited

U.S. PATENT DOCUMENTS

| 2003/0174686 | A1* | 9/2003 | Willenegger et al. | 370/342 |
|---|---|---|---|---|
| 2004/0166835 | A1* | 8/2004 | Johansson et al. | 455/414.1 |
| 2005/0069044 | A1 | 3/2005 | Iacono et al. | |
| 2005/0099968 | A1* | 5/2005 | Yamano | 370/311 |
| 2005/0239409 | A1* | 10/2005 | Oh et al. | 455/67.11 |
| 2006/0040698 | A1* | 2/2006 | Shiu et al. | 455/522 |
| 2006/0174179 | A1* | 8/2006 | Visvanathan et al. | 714/758 |

FOREIGN PATENT DOCUMENTS

| WO | 03 017527 | 2/2003 |
|---|---|---|
| WO | 2004 012361 | 2/2004 |

OTHER PUBLICATIONS

3GPP TS 34.108 V5.3.0, "$3^{rd}$ Generation Partnership Project; Technical Specification Group Terminals; Common Test Environments for User Equipment (UE); Conformance Testing (Release 5)", Technical Specification, pp. 1 to 824, 2004.

(Continued)

*Primary Examiner* — Hong Cho
*Assistant Examiner* — Eunsook Choi
(74) *Attorney, Agent, or Firm* — Oblon, Spivak, McClelland, Maier & Neustadt, L.L.P.

(57) ABSTRACT

A communication control apparatus (30, 10) used in a mobile communication system includes: means (32, 12) that derives a second target communication quality Q2 for TFs other than a reference format from a first target communication quality for the reference format in a plurality of TFs provide for communicating with an upper layer of a physical channel; means (33, 13) that derives a third target communication quality different from the first target communication quality from the first and the second target communication qualities; and means that sets the third target communication quality to be a target value of transmission power control.

8 Claims, 6 Drawing Sheets

OTHER PUBLICATIONS

3GPP TS 25.211 V5.6.0, "3$^{rd}$ Generation Partnership Project; Technical Specification Group Radio Access Network; Physical Channels and Mapping of Transport Channels Onto Physical Channels (FDD) (Release 5)", Technical Specification, pp. 1 to 51, 2004.

3GPP TS 25.214 V5.9.0, "3$^{rd}$ Generation Partnership Project; Technical Specification Group Radio Access Network; Physical Layer Procedures (FDD) (Release 5)", Technical Specification, pp. 1 to 64, 2004.

* cited by examiner

COMMUNICATION CONTROL APPARATUS AND COMMUNICATION CONTROL METHOD

TECHNICAL FIELD

The present invention generally relates to a communication control apparatus and a communication control method. More particularly, the present invention relates to a transmission control method, a mobile station and a radio control station in a mobile communication system.

BACKGROUND ART

Generally, in a mobile communication system, when a channel is set for a communication, the channel has one or more transmission formats. Since the present invention particularly relates to a case in which the channel has more than one transmission format, explanations are provided for the case in which the channel has more than one transmission format in the following.

In the following, explanations are provided for a transport channel in a WCDMA scheme of 3GPP as the channel.

FIG. 1 shows a mapping relationship among major physical channels (left side), transport channels (center) and logical channels (right side). The transport channel is a channel provided from a physical layer to a MAC sublayer, and it is classified based on transmission forms, and is characterized by information that is transferred via a radio interface and how it is transferred. By the way, DPCH of the physical channel includes DPDCH (Dedicated Physical Data Channel) for transmitting data and DPCCH (Dedicated Physical Control Channel) for transmitting a control command for transmission power control and a pilot bit and the like. By multiplexing a plurality of transport channels into the physical channel and transmitting them, multiplexing of user data and control information, and multiplexing of data of plurality of users due to multiple calls can be performed.

As an example, as to a packet channel (non-patent document 1: 3GPP TS34.108 v4.7.0, 6.10.2.4.1.25.2) of a transmission speed of 64 kbps in a downlink, operation is described for a case in which the transport channel has more than one transmission format.

In the packet channel of the transmission speed of 64 kbps, two transport channels DCH are mapped to a physical channel DPDCH for data communication, and logical channels DTCH and DCCH are mapped to the two transport channels DCH respectively. A set of transport formats (TF) used for the transport channels is called a transport format set (TFS). The TF is a format by which TFS is transmitted, and is a format for supplying a transport block for each TTI (transmission time interval) on the transport channel. The transport block is a basic unit when performing data transfer in the physical layer and the MAC layer. A combination of one or more TFs that can be simultaneously transferred in the physical layer is called a transport format combination (TFC). A set of all TFCs that can be transferred by this physical channel is called a transport format combination set (TFCS). As to the packet channel of the transmission speed of 64 kbps, table 1 shows TFS of DCH on which DTCH is mapped as an example, table 2 shows TFS of DCH on which DCCH is mapped as an example, and table 3 shows TFCS as an example.

TABLE 1

| TFS of DCH to which DTCH is mapped | |
|---|---|
| # | |
| TF0 | 0 × 336 |
| TF1 | 1 × 336 |
| TF2 | 2 × 336 |
| TF3 | 3 × 336 |
| TF4 | 4 × 336 |

TABLE 2

| TFS of DCH to which DCCH is mapped | |
|---|---|
| # | |
| TF0 | 0 × 148 |
| TF1 | 1 × 148 |

TABLE 3

| TFCS | | |
|---|---|---|
| # | DCH to which DTCH is mapped | DCH to which DCCH is mapped |
| TFC0 | 0 × 336 | 0 × 148 |
| TFC1 | 0 × 336 | 1 × 148 |
| TFC2 | 1 × 336 | 0 × 148 |
| TFC3 | 1 × 336 | 1 × 148 |
| TFC4 | 2 × 336 | 0 × 148 |
| TFC5 | 2 × 336 | 1 × 148 |
| TFC6 | 3 × 336 | 0 × 148 |
| TFC7 | 3 × 336 | 1 × 148 |
| TFC8 | 4 × 336 | 0 × 148 |
| TFC9 | 4 × 336 | 1 × 148 |

In each table, "336" and "148" indicate a size (number of bits) of the transport block of DCH to which DTCH is mapped and a size of transport block of DCH to which DCCH is mapped respectively. In addition, each of the coefficients by which these numbers are multiplied indicates a number of transport blocks.

When a radio control station starts communication using the packet channel of the transmission speed of 64 kbps, the radio control station sets TFS, TFCS, QoS (DCH quality target) of each transport channel and the like to report the setting information to a mobile station and a radio base station. Then, the mobile station and the radio base station perform communication based on the setting information. The radio control station sets TF of each DCH for each TTI (sets TFC from the viewpoint of TFCS) based on a size of data to be transmitted and status of radio environment (congestion status of radio section, transmission power required for satisfying the DCH quality target, for example) and the like. Then, the radio base station performs downlink transmission using the TF (or TFC) set by the radio control station.

For example, when there are both of packet data (DTCH) and control information (DCCH) of logical channels as data to be transmitted, the radio control station may select TFC9 shown in the table 3 as TFC. In addition, when there is only the packet data (DTCH) as data to be transmitted but there is not the control information (DCCH), and when the size of the packet data (DTCH) is one that can be adequately transmitted with a transmission speed of 32 kbps, the radio control station selects TFC4 in the table 3 as TFC. In this case, the DCH to which DCCH is mapped is not transmitted (this state is called DTX). In addition, when neither the packet data (DTCH) nor the control information (DCCH) exists as data to be transmitted, the radio control station selects TFC0 in the table 3 as TFC. In this case, the two DCHes are not transmitted (becomes DTX). That is, DPDCH that is a physical channel is not transmitted.

On the other hand, in order to achieve QoS (DCH quality target) of the transport channel, the mobile station performs inner loop power control based on SIR of a short section and performs outer loop power control based on receive quality (BLER or BER) of a long section. Generally, in the inner loop power control, the mobile station (or base station) measures a receive SIR (Signal to Interference ratio) for example, to report, to the base station (or the mobile station), an "UP" command when the receive SIR is below a target SIR, and to report a "Down" command when the receive SIR is not below the target SIR. The base station (or mobile station) changes the transmission power, by 1 dB for example, according to information indicated by the command. In this transmission power control, SIR in a short period which is 0.667 ms typically is measured. In the outer loop power control, the target SIR is controlled such that a block error rate (BLER) or a bit error rate (BER) becomes a target value. In this transmission power control, SIR in a long period that is 100 ms typically is measured.

When a plurality of transport channels are mapped to a physical channel, the outer loop power control is controlled to satisfy QoS (DCH quality target) of each transport channel. By the way, generally, since rate matching is performed to change the number of bits of a coded data sequence mapped to the physical channel in order to satisfy each QoS (DCH quality target) for the plurality of transport channels, QoS can be satisfied for all of the plurality of transport channels by performing outer loop power control for one of the plurality of transport channels. Also when the rate matching is not adequately performed, the mobile station performs outer loop power control so as to satisfy QoS of all transport channels.

On the other hand, as to each TF of a transport channel, the mobile station performs outer loop power control without distinguishing each TF. That is, in a case of DCH to which DTCH is mapped in the example of the packet channel of the transmission speed of 64 kbps, inner loop power control and outer loop power control are performed without distinguishing each of TF0, TF1, TF2, TF3 and TF4. That is, one transport block in TF1 and four transport blocks in TF4 are treated equally.

Next, a case is described in which one transport channel DCH is mapped to A-DPCH (Associated Dedicated Physical Channel) that is one of a downlink physical channel of high speed downlink packet access (HSDPA), and DCCH is mapped to the DCH. The HSDPA is a transmission scheme for realizing high speed packet transmission in a downlink direction (refer to non-patent documents 2 and 3, for example) in 3GPP. The A-DPCH is a dedicated physical channel transmitted being associated with a shared data channel HS-PDSCH (HS-DSCH as a transport channel) and a shared control channel HS-SCCH in HSDPA. In the downlink of HSDPA, since the packet data (DTCH) is transmitted using HS-PDSCH, only control information (DCCH) is transmitted using A-DPCH.

Table 4 shows TFS of DCH to which DCCH is mapped in A-DPCH (non-patent document 1: 3GPP TS34.108 v5.3.0, 6.10.2.4.1.2.2).

TABLE 4

TFS of DCH in A-DPCH

| # | |
|---|---|
| TF0 | 1 × 0 |
| TF1 | 1 × 148 |

In this example, since the number of the transport channel is one, TFS is the same as TFCS. In this case, when there is control information (DCCH) to be transmitted, the radio control station selects TF1 in the table 4 as a transmission format (TF), and selects TF shown in the table 4 as TF when there is no control information (DCCH) to be transmitted. In DCH of A-DPCH of HSDPA, different from the above-mentioned DCH in the packet of the transmission speed of 64 kbps, one transport block of 0 bit is transmitted instead of DTX when there is no control information (DCCH) to be transmitted. By the way, when the transport block of 0 bit is transmitted, since CRC is added to the transport block of 0 bit, the mobile station can calculate a block error rate, so that outer loop power control can be performed even when receiving TF0.

The reason why the transport block of 0 bit is transmitted instead of becoming DTX when there is no control information (DCCH) to be transmitted is that the mobile station performs outer loop power control to keep receive quality of the A-DPCH to be a predetermined target quality in both cases of TF0 and TF1. The receive quality is BLER of DCH, SIR of TPC command and dedicated pilot in DPCCH, and the like.

There is a difference of about 1.5 dB~2.0 dB in a required SIR per 1 symbol between a case in which transmission is performed using TF0 of table 4 and a case in which transmission is performed using TF1 of table 4. That is, the required SIR per 1 symbol is smaller by about 1.5~2.0 dB in the case in which transmission is performed using TF0 compared with the case in which transmission is performed using TF1.

By the way, the control information DCCH is control information for performing report on, for example, Active Set Update, Measurement control, Physical channel reconfiguration and the like, and the transmission occurrence frequency is small. In other words, in most time, transmission is performed using TF0 in the table 4, and transmission using the TF1 in the table 4 is performed once in a while.

On the other hand, as mentioned above, when receiving more than one TF, the mobile station performs inner loop power control and outer loop power control without distinguishing the difference of the more than one TF. That is, as to A-DPCH, the mobile station performs inner loop power control and outer loop power control without distinguishing the difference of TFs when the radio base station performs transmission using the TF0 in the table 4 and also when the radio base station performs transmission using the TF1 in the table 4.

On the basis of the above-mentioned facts, since transmission is mainly performed using TF0 shown in the table 4 in A-DPCH, the target SIR of inner loop power control in the mobile station converges with respect to TF0 in the table 4. In this case, the target quality is smaller than required SIR as for TF1 in the table 4. As a result, as to TF1, a predetermined QoS (DCH quality target) cannot be satisfied.

For the above-mentioned problem, when the radio base station transmits TF1, it may be considered to increase transmission power compared with the case for transmitting TF0, for example. However, by such a method, since complexity of apparatuses implemented for all of many radio base stations becomes very large, that is not a realistic solving measure.

[Non-patent document 1] 3GPP TR34.108v5.3.0
[Non-patent document 2] 3GPP TR25.211v5.6.0
[Non-patent document 3] 3GPP TR25.214v5.9.0

DISCLOSURE OF THE INVENTION

Problem to be Solved by the Invention

As mentioned above, generally, in the downlink, the radio control station selects a proper TF (TFC) from among a plurality of TFs for each DCH according to presence or absence of data, status of radio environment and the like, so that the radio base station performs downlink transmission using the TF (TFC). Then, the mobile station performs inner loop power control and outer loop power control without distinguishing differences among TFs for each DCH.

Therefore, when required SIR for satisfying a target quality of DCH is different among the plurality of TFs, the target quality (target SIR) of the inner loop power control converges with respect to TF by which transmission frequency is large. As a result, there occurs a problem in that a receive quality (BLER) of TF by which transmission frequency is small becomes excessively good or excessively bad. Especially, when required SIR for satisfying a target quality of DCH of a transmission format (TF) for which transmission frequency is small is larger than required SIR for satisfying a target quality of DCH of a transmission format (TF) for which transmission frequency is large, the receive quality (BLER) of the TF for which transmission frequency is small becomes excessively bad. Thus, influence to the system is large.

A problem of the present invention is to provide a communication control apparatus and a communication control method for addressing a problem caused by the fact that the required SIR for satisfying the target quality of DCH is different among a plurality of transmission formats (TFs) in a mobile communication system in which a plurality of TFs are provided for the transport channel.

Means for Solving the Problem

In the present invention, a communication control apparatus used in a mobile communication system including a radio base station, a mobile station performing communication with the radio base station via a radio link and a radio control station connected to the radio base station is used. In the communication, a channel is established for communication with an upper layer of a physical layer, and the channel has a plurality of transmission formats, and the communication control apparatus includes:

means that derives, from a first target communication quality for the channel, a second target communication quality for the plurality of transmission formats;

means that derives a third target communication quality different from the first target communication quality from the first and the second target communication qualities; and means that sets the third target communication quality to be a target value of transmission power control.

Effect of the Invention

Deterioration of communication quality due to difference of required SIR for satisfying the quality target of DCH can be decreased and system reliability can be increased.

Figure 1:
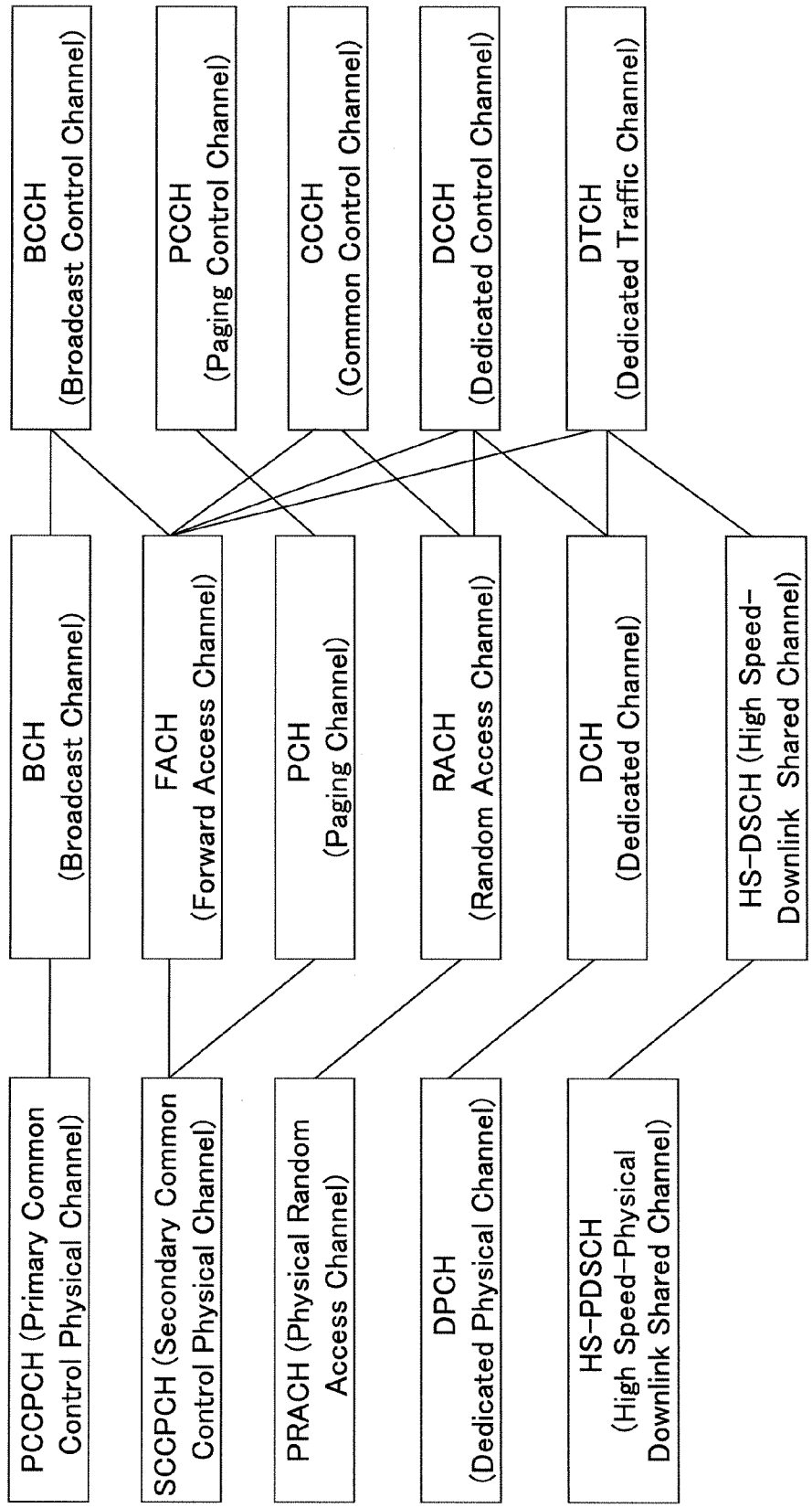
FIG. 1 is a diagram showing a mapping relationship among major physical channels, transport channels and logical channels.

DESCRIPTION OF REFERENCE SIGNS 10 mobile station; 20 radio base station; 30 radio control station; 11 target quality Q1 obtaining unit; 12 target quality Q2 obtaining unit; 13 target quality determination unit; 14 transmission power control unit; 31 target quality Q1 obtaining unit; 32 target quality Q2 obtaining unit; 33 target quality determination unit; 34 target quality information transmitting unit.

Preferred Embodiments For Carrying Out The Invention

According to an embodiment of the present invention, in a mobile communication system in which a plurality of transmission formats (TFs) are provided for DCH, when a required quality (SIR, for example) of each TF for a target quality is different with each other, a communication control apparatus converts a quality Q1 required by the system such that a desired TF quality becomes a target quality based on characteristic difference of each TF. The characteristic difference of each TF may be evaluated by receive quality (BLER, for example) under a specific condition, transmission frequency of each TF, priority or importance of each TF, and the like, for example. By performing communication using a required quality Q3 that is converted, apparatus complexity in the mobile station and the radio base station can be kept minimum, and deterioration of system performance due to difference among required qualities (SIR, for example) of the TFs can be prevented.

By simply changing the target quality of transmission power control from Q1 to Q3, required SIR of each TF can be achieved even when required SIR per one symbol is different among a plurality of TFs. As mentioned later, the quality Q1 is set such that influence of handover error and loss of synchronization can be kept within an allowable range. Different from Q1, Q3 is set in consideration of the fact that required SIR is different for each TF and in consideration of an actual transmission frequency and the like. Therefore, it is difficult to convert the value of Q1 to a proper value of Q3 from the very beginning.

The third target communication quality may be derived such that a transmission format by which a required quality is the highest among the plurality of transmission formats satisfies the first target communication quality. The third target communication quality may be derived based on use frequency of each of the plurality of transmission formats. Each of the plurality of transmission formats may be defined as a format transmitting data of a predetermined number of bits which is equal to or greater than 0. The data may be a control signal of a logical channel. The third target communication quality may be set to be better than the first target communication quality (for example, when the first target communication quality is BLER 1%, the third target communication quality is set to be BLER 0.1%). The first target communication quality may be a target communication quality of a logical channel and the third target communication quality may be a target communication quality of a transport channel. The communication control apparatus may be provided in a radio control station, or may be provided in a mobile station.

Embodiment 1

Figure 2:
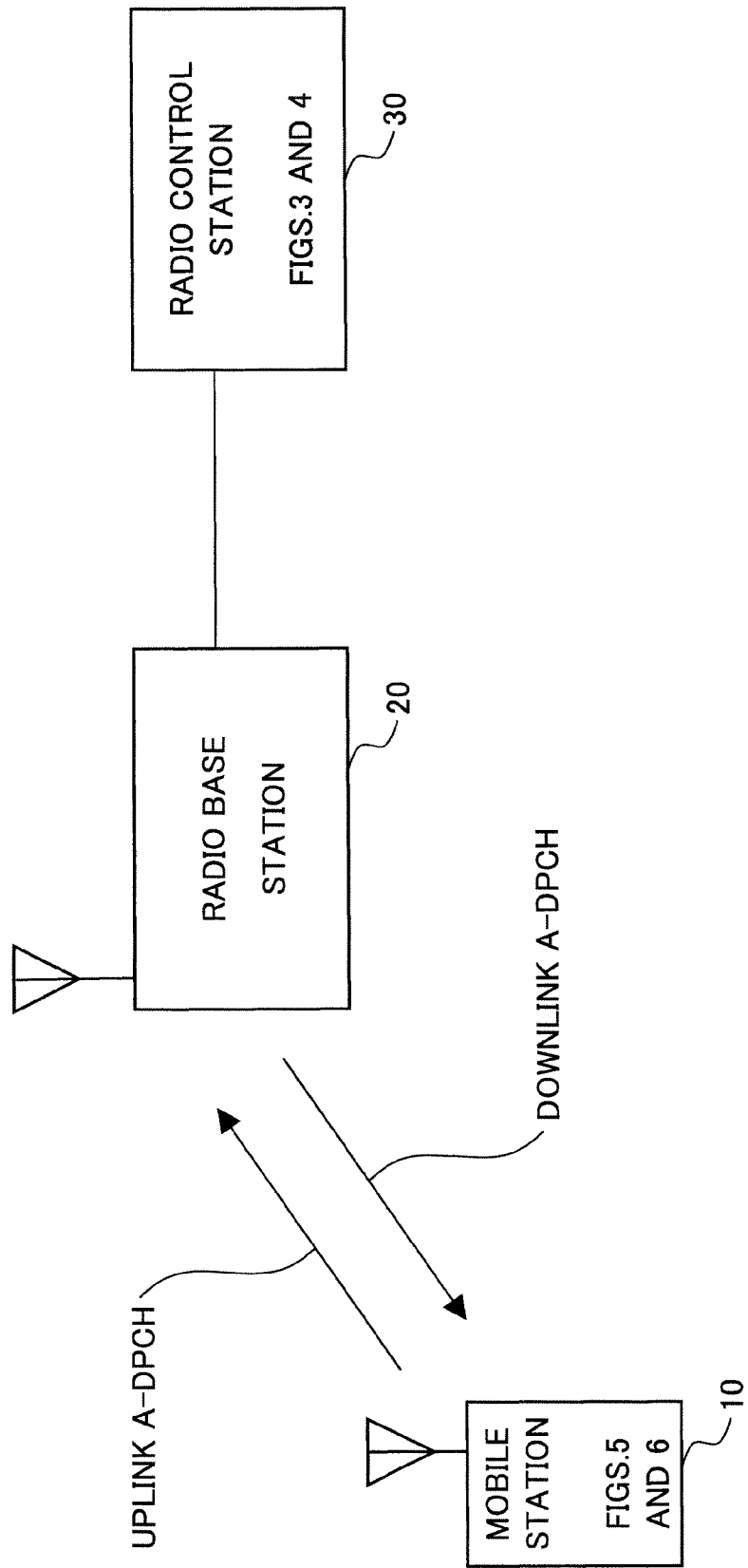
FIG. 2 is a diagram showing a system configuration example of a mobile communication system according to an embodiment of the present invention.

In the following, the embodiment of the present invention is described with reference to figures. FIG. 2 shows a system configuration example of a mobile communication system to which the present invention is applied. As shown in the figure, the mobile communication system includes a radio base station 20, a radio control station 30 for controlling it, and a mobile station 10. This embodiment relates to a case for performing communication using a plurality of transmission formats (TFs). In this embodiment, an example is described in which two types of TF0 and TF1 shown in the table 4 are transmitted in the downlink A-DPCH in HSDPA. The TF0 is a transmission format (TF) for transmitting one transport block of 0 bit, and the TF1 is a transmission format (TF) for transmitting one transport block of 148 bits.

Figure 3:
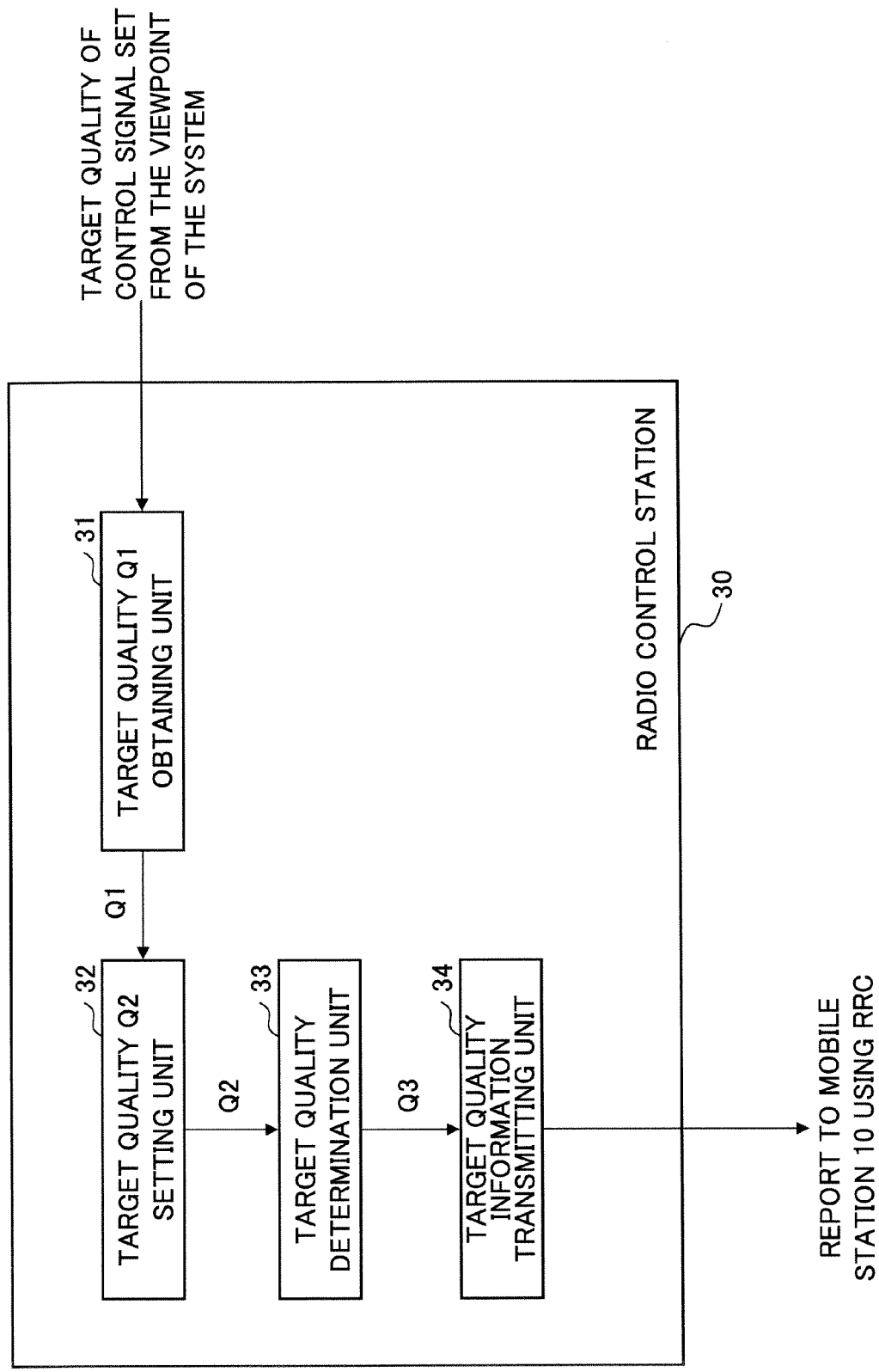
FIG. 3 is a diagram showing a configuration example of a radio control station according to an embodiment of the present invention.

FIG. 3 is a functional block diagram showing a configuration example of the radio control station 30 shown in FIG. 2. As shown in FIG. 3, the radio control station 30 includes a target quality Q1 obtaining unit 31, a target quality Q2 setting unit 32, a target quality determination unit 33, and a target quality information transmitting unit 34. By the way, among various functions provided in the radio control station 30, FIG. 2 shows parts for setting the target quality (DCH quality target) of the downlink of DCH to be mapped to A-DPCH in the present embodiment.

The target quality Q1 obtaining unit 31 obtains a target quality Q1 (first target quality) of a control signal (DCCH), and reports the target quality Q1 to the target quality Q2 setting unit 32. The target quality Q1 may be obtained from a station data stored in the radio control station 30. Alternatively, the target quality Q1 of the control signal (DCCH) may be obtained by being specified from a remote upper node (a server on a core network, for example) of the radio control station 30. The target quality Q1 is an amount indicating some sort of communication quality, and it may be a block error rate (BLER) or a bit error rate (BER). An error of the control signal causes handover error, loss of synchronization due to handover error, or the like. Therefore, the target quality Q1 of the control signal (DCCH) is set such that the influence caused by the handover error or the loss of synchronization is kept within an allowance.

The target quality Q2 setting unit 32 receives the first target quality Q1 from the target quality Q1 obtaining unit 31. Then, the target quality Q2 setting unit 32 selects a TF that becomes a reference (reference TF) from among TFs of DCH mapped to the channel (A-DPCH in the present embodiment) so as to obtain a quality of each TF in a state in which the reference TF satisfies the target quality Q1, and set the qualities to the second target quality Q2 (TF). The target quality Q2 setting unit 32 reports the target quality Q2 of each TF to the target quality determination unit 33. As the reference TF, a TF having highest priority or a most important TF may be selected.

For example, assuming that TF1 is the reference TF and that Q1=0.01 (this value is BLER), the target quality Q2 setting unit 32 makes settings such that Q2(TF1)=0.01 and Q2(TF0)=0.001. By the way, the value of Q2 (TF) (TF=TF0 or TF1) is determined according to a coding method or propagation environment of radio parts. For example, the radio control station 30 may have a reference table shown in table 5 so as to set Q2(TF) by referring to the table.

TABLE 5 reference table (BLER)

| # | Q2 |
|---|---|
| TF0 | 0.001 |
| TF1 | 0.01 |

Alternatively, the radio control station 30 may obtain the Q2(TF) based on a required SIR for satisfying the target quality Q1 for each TF. In this case, the radio control station 30 may have a reference table shown in table 6 so as to set Q2(TF) by referring to the table.

TABLE 6 reference table (SIR)

| # | Q2 |
|---|---|
| TF0 | −1.5 dB |
| TF1 | 0 dB |

The target quality determination unit 33 determines a target quality Q3 (third target quality) that is actually reported to the mobile station 10 based on the target quality Q2(TF) of each TF from the target quality Q2 setting unit 32. Then, the target quality determination unit 33 reports the target quality Q3 to the target quality information transmitting unit 34. As an example, the target quality determination unit 33 may determine the target quality Q3 based on traffic model (transmission frequency) of each TF. For example, assuming that transmission frequency of TF0 is 95% and that transmission frequency of TF1 is 5%, the target quality determination unit 33 determines that transmission is performed using TF0 in most cases, and it may make setting such that Q3=Q2(TF0)=0.001. Alternatively, the setting may be made such that Q3=0.95×Q2(TF0)+0.05×Q2(TF1)=0.00145 by weighting using the transmission frequencies. When the transmission frequency of TF0 is 60% and the transmission frequency of TF1 is 40%, Q3 may be determined by weighting using transmission frequency of each TF such that Q3=0.6×Q2(TF0)+0.4×Q2(TF1)=0.0046. The radio control station 30 may measure past transmission frequency to obtain the transmission frequency of each TF, or the transmission frequency of each TF may be obtained by inputting a predetermined value or an empirical value from the outside.

In addition, for example, the target quality determination unit 33 may determine the target quality Q3 based on priority or level of importance of each TF. That is, Q3 may be determined such that the quality of TF for which priority or the level of importance is high realizes the target quality Q1. For example, since the level of importance of TF1 is higher between the TF0 and TF1, Q3 may be determined such that the quality of TF1 realizes the target quality Q1 in any transmission frequency. In this case, Q3 is set to be 0.001 such that the target quality Q1 of TF1 realizes even when TF0 is transmitted with 100% of probability.

The target quality information transmission unit 34 receives the target quality Q3 from the target quality determination unit 33, and reports the value of the target quality Q3 as a target quality (quality target) of DCH to the mobile station 10 using the radio resource control (RRC).

By the way, in the present embodiment, the radio control station 30 obtains, from the outside (indicating station data and the like, for example), the target quality Q1 that is determined from the viewpoint of the system, and calculates the target quality (Q3) to be finally reported to the mobile station 10 based on the target quality Q1. However, this invention is not limited to that example, and Q3 may be derives by a quality setting apparatus other than the radio control station so that the radio control station may receive it and report it to the mobile station (such a quality setting apparatus includes components shown in FIG. 3).

In addition, the radio control station 30 may determine On/Off of control of the present embodiment according to types of the base station controlled by the radio control station 30. For example, when a base station controlled by the radio control station 30 has a capability to increase transmission power in a case when the base station sends TF1 compared with a case when sending TF0 in consideration of difference of required SIR between TF0 and TF1, the control of the present embodiment may be made Off. When a base station controlled by the radio control station 30 does not have a capability to increase transmission power in a case when the base station sends TF1 compared with a case when sending TF0 in consideration of difference of required SIR between TF0 and TF1, the control of the present embodiment may be made On.

Figure 4:
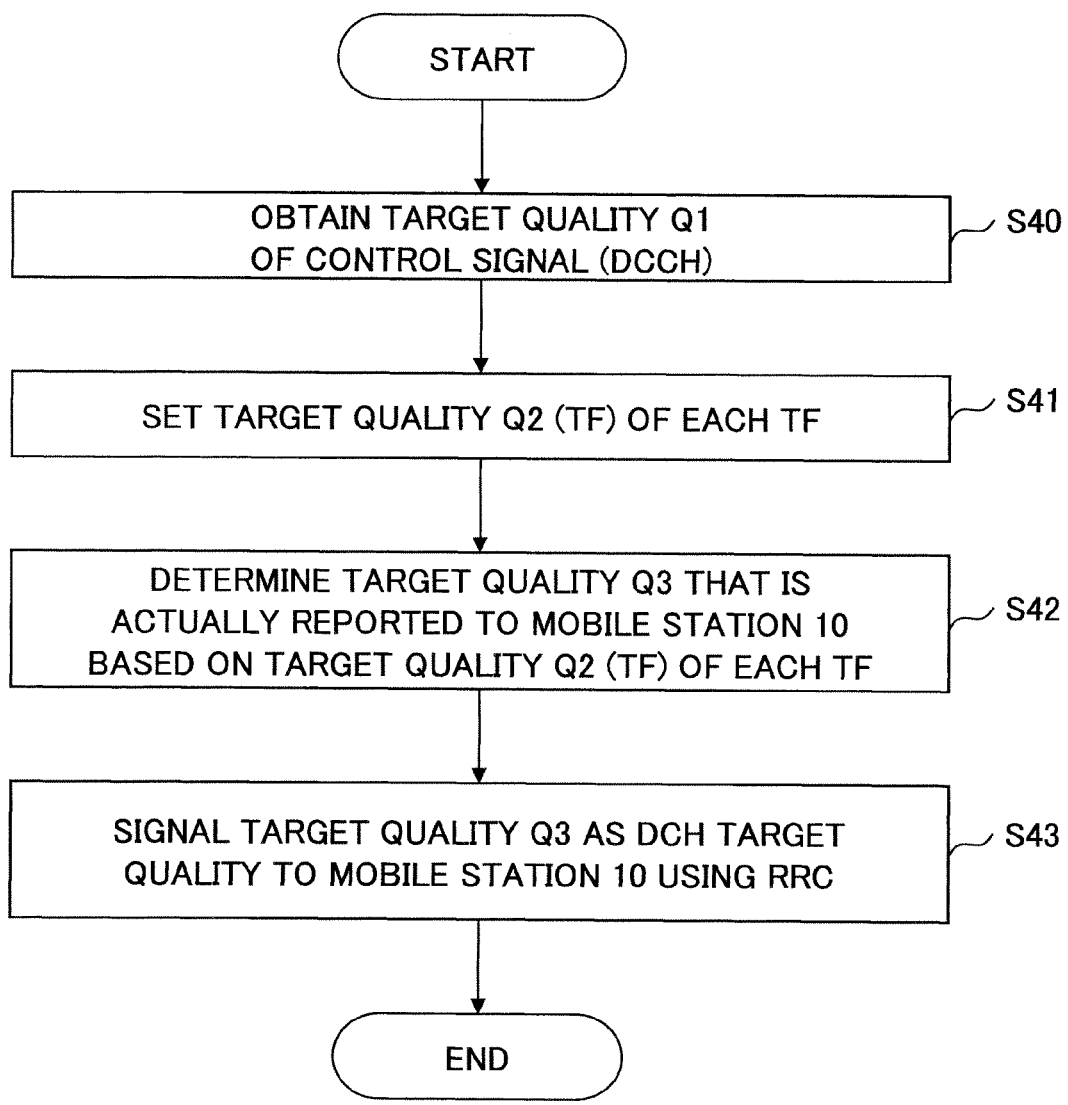
FIG. 4 is a flowchart showing operation of the radio control station according to an embodiment of the present invention.

Next, operation of the radio control station 30 of the present invention is described with reference to a flowchart shown in FIG. 4.

In step S40, the radio control station 30 obtains a first target quality Q1 of the control signal (DCCH).

In step S41, the radio control station 30 sets a target quality Q2 (TF) of each TF. The Q2 (TF) includes values corresponding to quality of each TF in a state in which the reference TF satisfies the target quality Q1. That is, based on a first target quality Q1 for the reference TF in the plurality of TFs, a target quality (second target quality) Q2 for other TF is derived.

In step S42, the radio control station 30 determines a third target quality Q3 to be actually reported to the mobile station 10 based on the target quality Q2 (TF) of each TF. As mentioned above, Q3 may be determined in consideration of transmission frequency or priority of each TF.

In step S43, the radio control station 30 signals the target quality Q3 as a target quality of DCH to the mobile station 10 using RRC.

Embodiment 2

Figure 5:
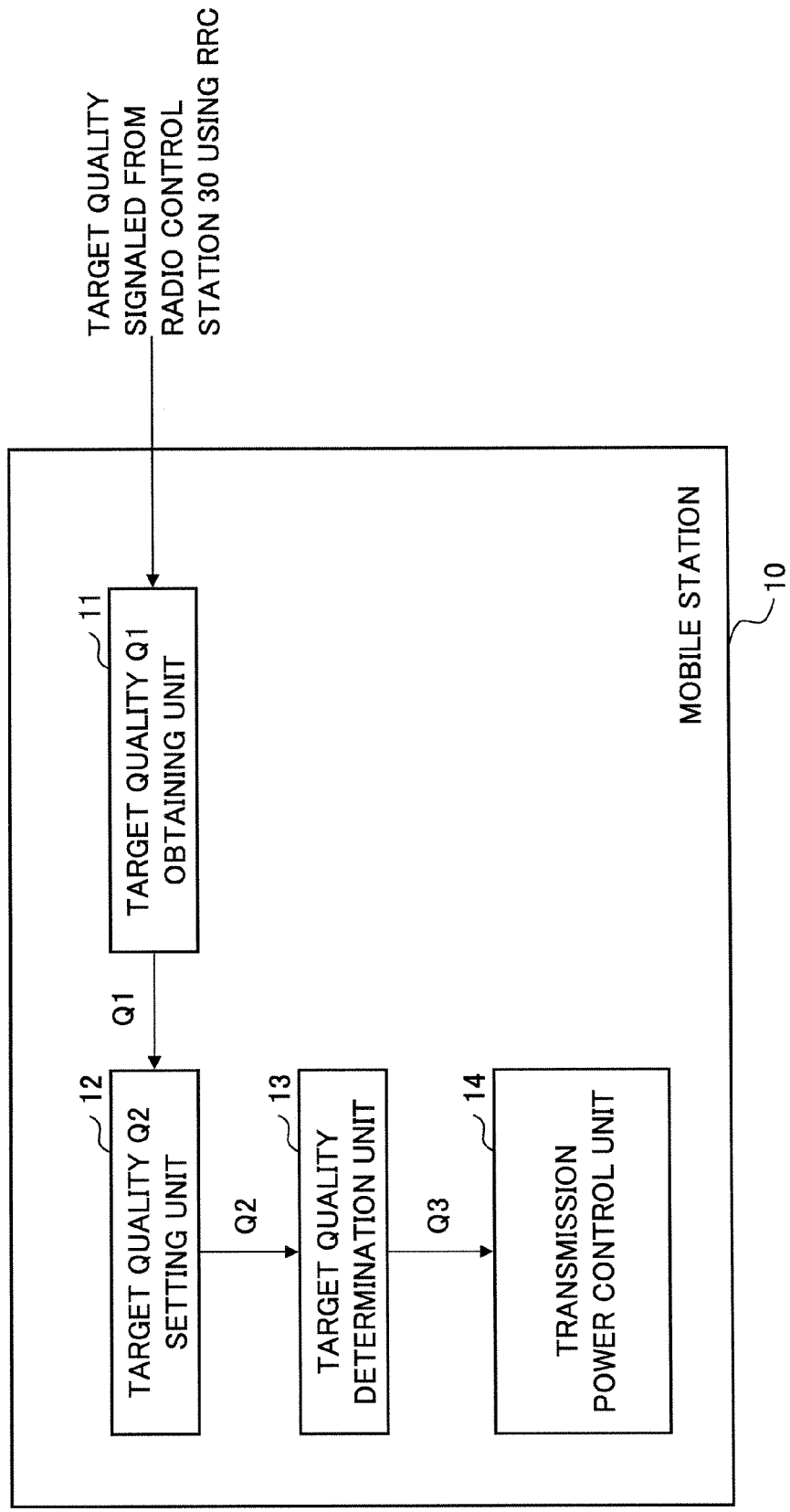
FIG. 5 is a diagram showing a configuration example of a mobile station according to an embodiment of the present invention.
Figure 6:
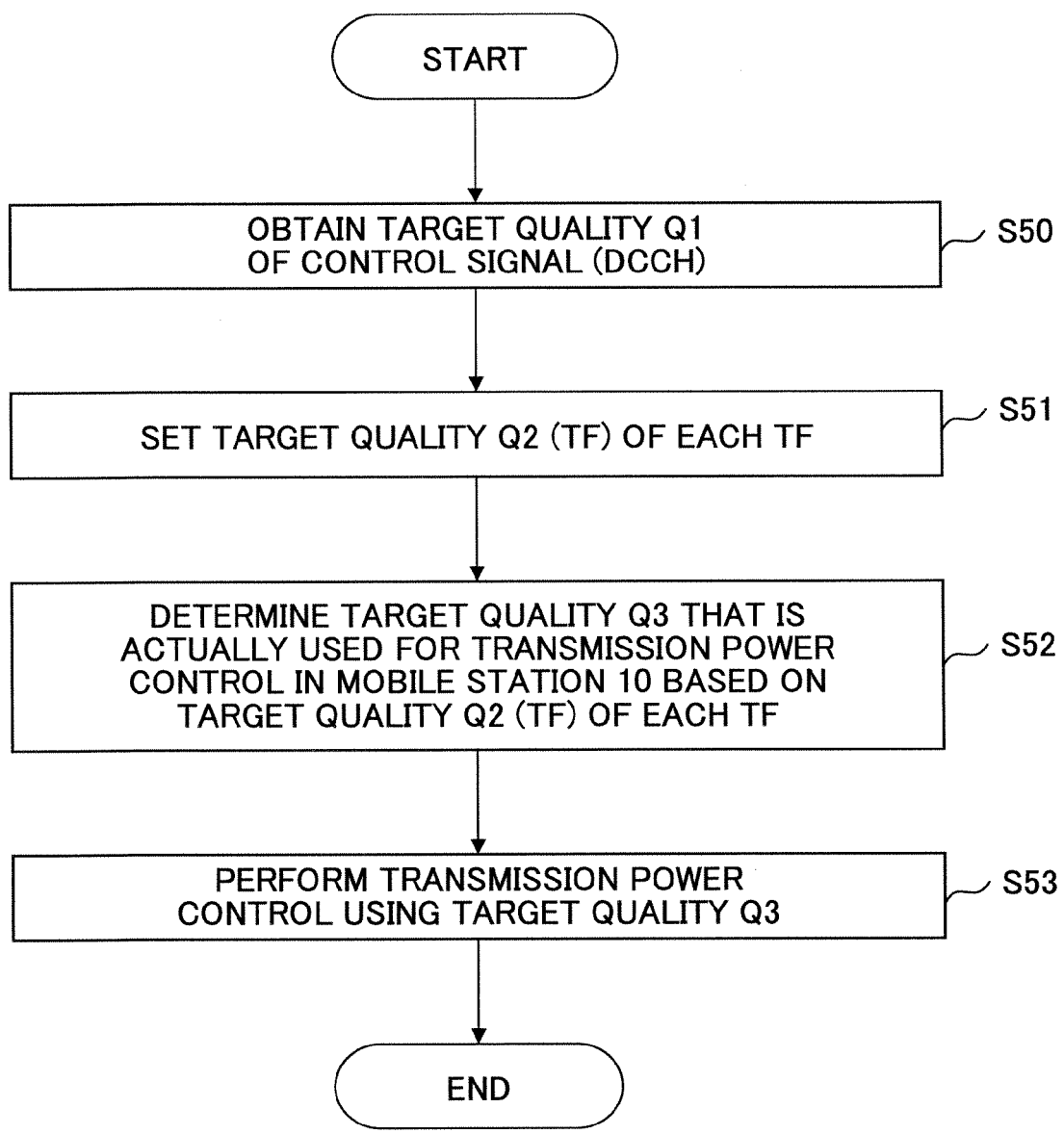
FIG. 6 is a flowchart showing operation of the mobile station according to an embodiment of the present invention.

Although the radio control station 30 converts Q1 to Q3 in the embodiment 1, the mobile station 10 may converts Q1 to Q3. In this case, the radio control station 30 reports Q1 to the mobile station as a target quality of DCH. The mobile station 10 of the present embodiment is configured as shown in FIG. 5, for example. The mobile station 10 includes a target quality Q1 obtaining unit 11, a target quality Q2 setting unit 12, a target quality determination unit 13, and a transmission power control unit 14. By the way, among various functions of the mobile station 10, FIG. 5 shows parts relating to the present embodiment (parts for setting a downlink target quality of DCH mapped to A-DPCH and performing transmission power control based on the target quality).

The target quality Q1 obtaining unit 11, the target quality Q2 setting unit 12 and the target quality determination unit 13 have configurations and functions similar to those of the target quality Q1 obtaining unit 31, the target quality Q2 setting unit 32 and the target quality determination unit 33. Thus, overlapping explanation is not given. The transmission power control unit 14 receives the target quality Q3 from the target quality determination unit 13, and based on it, performs inner loop power control and outer loop power control.

Next, operation of the mobile station 10 of the present modified example is described with reference to a flowchart shown in FIG. 5.

In step S50, the mobile station 10 obtains a target quality Q1 (first target quality) of the control signal (DCCH).

In step S51, the mobile station 10 sets a target quality Q2 (TF) of each TF. The Q2 (TF) includes values corresponding to quality of each TF in a state in which reference TF satisfies the target quality Q1. That is, based on the first target quality Q1 for the reference TF, a target quality (second target quality) Q2 for other TF is derived.

In step S52, the mobile station 10 determines a third target quality Q3 to be actually used for transmission power control (inner loop power control and outer loop power control) based on the target quality Q2 (TF) of each TF. As mentioned above, Q3 may be determined in consideration of transmission frequency or priority of each TF.

In step S53, the mobile station 10 performs the transmission power control (inner loop power control and outer loop power control) based on the target quality Q3.

As mentioned above, although the preferred embodiments of the present invention are described, the present invention is not limited to these, and variations and modifications may be made without departing from the scope of the present invention.

The present international application claims priority based on Japanese patent application No.2005-130292, filed in the JPO on Apr. 27, 2005, the entire contents of which are incorporated herein by reference.

The invention claimed is:

1. A communication control apparatus used in a mobile communication system including a radio base station, a mobile station performing communication with the radio base station via a radio link and a radio control station connected to the radio base station,
   wherein, in the communication, a channel is established for communication in an upper layer of a physical layer, and choices of a plurality of transmission formats are provided as transmission formats of communication by the channel, the plurality of transmission formats including a reference transmission format and one or more of other transmission formats, the communication control apparatus comprising:
   a target quality setting unit configured to derive, from a first target communication quality for the channel, a second target communication quality for each of the one or more of other transmission formats, the second target communication quality being satisfied by the one or more of other transmission formats when the reference transmission format satisfies the first target communication quality for the channel; and
   a target quality determination unit configured to derive a third target communication quality based on a transmission frequency of each of the plurality of transmission formats and the first and the second target communication qualities, and set the third target communication quality to be a target value of transmission power control in the radio link.

2. The communication control apparatus as claimed in claim 1, wherein the third target communication quality is derived such that a transmission format by which a required quality is the highest among the plurality of transmission formats satisfies the first target communication quality.

3. The communication control apparatus as claimed in claim 1, wherein each of the plurality of transmission formats is defined as a format transmitting data of a predetermined number of bits which is equal to or greater than 0.

4. The communication control apparatus as claimed in claim 3, wherein the plurality of transmission formats include a format for transmitting data of 0 bit and a format for transmitting a control signal of a logical channel.

5. The communication control apparatus as claimed in claim 1, wherein the third target communication quality is set to be better than the first target communication quality.

6. The communication control apparatus as claimed in claim 1, wherein the first target communication quality is a target communication quality of a logical channel and the third target communication quality is a target communication quality of a transport channel.

7. The communication control apparatus as claimed in claim 1, wherein the communication control apparatus is provided in the mobile station or in the radio control station.

8. A communication control method used in a mobile communication system including a radio base station, a mobile station performing communication with the radio base station via a radio link and a radio control station connected to the radio base station, wherein, in the communication, a channel is established for communication with an upper layer of a physical layer, and choices of a plurality of transmission formats are provided as transmission formats of communication by the channel, the plurality of transmission formats including a reference transmission format and one or more of other transmission formats, the communication control method comprising:

deriving, from a first target communication quality for the channel, a second target communication quality for each of the one or more of other of transmission formats, the second target communication quality being satisfied by the one or more of other transmission formats when the reference transmission format satisfies the first target communication quality for the channel;

deriving a third target communication quality based on a transmission frequency of each of the plurality of transmission formats, and the first and the second target communication qualities; and setting the third target communication quality to be a target value of transmission power control in the radio link.

* * * * *